United States Patent

[11] 3,619,412

| [72] | Inventors | Claude Clement;<br>Emmanuel E. Neel; Andre P. Anselme, all of Petit-Couronne, France |
|---|---|---|
| [21] | Appl. No. | 781,622 |
| [22] | Filed | Dec. 5, 1968 |
| [45] | Patented | Nov. 9, 1971 |
| [73] | Assignee | Shell Oil Company<br>New York, N.Y. |
| [32] | Priority | Dec. 5, 1967 |
| [33] | | France |
| [31] | | 130,974 |

[54] MORDENITE-CONTAINING HYDROCRACKING CATALYST
16 Claims, No Drawings

[52] U.S. Cl.................................................. 208/111, 252/442, 252/455
[51] Int. Cl.............................................. C10g 13/02, B01j 11/78

[50] Field of Search........................................... 252/442, 455 Z; 208/111

[56] References Cited
UNITED STATES PATENTS

| 3,318,802 | 5/1967 | Martin........................ | 208/111 |
| 3,325,396 | 6/1967 | Lindquist.................... | 208/111 |
| 3,376,215 | 4/1968 | Bertolacini................. | 252/455 X |
| 3,403,108 | 9/1968 | Leftin........................ | 252/455 X |
| 3,435,085 | 3/1969 | White et al................. | 252/442 X |
| 3,464,929 | 9/1969 | Mitsche...................... | 252/442 |

*Primary Examiner*—Daniel E. Wyman
*Assistant Examiner*—C. F. Dees
*Attorney*—Harold L. Denkler

ABSTRACT: A catalyst particularly suitable for hydrocracking is prepared by impregnating a support consisting of a mixture of mordenite and amorphous silica-alumina with a solution of a fluorine compound, drying, and treating with a solution containing one or more hydrogenative metals.

MORDENITE-CONTAINING HYDROCRACKING CATALYST

BACKGROUND OF THE INVENTION

1. Field of the Invention

This invention relates to the preparation of a catalyst for the conversion of hydrocarbons.

2. Description of the Prior Art

Hydrocracking of hydrocarbon oils is well known in the petroleum refining art and is usually carried out at relatively high temperatures under hydrogen pressure in the presence of a catalyst having both a hydrogenation and cracking function. Hydrogenation is catalyzed by hydrogenative metal components. The acid function is conventionally supplied by the catalyst carrier, as for example, a solid refractory oxide, such as silica and alumina, which is enhanced in acidity by the incorporation of a halogen component. Catalyst supported on amorphous refractory oxide, such as silica-alumina, have relatively low catalytic activity and, in many cases, poor stability, i.e., the ability to retain activity over a sustained period of time.

More recently, crystalline alumino-silicate zeolites have found wide use as catalyst supports of high activity. While the zeolites are extremely active they tend to lose their activity rapidly, thus requiring frequent regeneration or replacement. Mordenite is a class of zeolites which is frequently used.

Mordenite is a crystalline zeolite having the chemical formula $Na(Si_5Al0_{12})3H_2O$. Mordenite is thus characterized by the high atomic proportion of silicon with respect to aluminum and by its crystalline structure. The elementary cell of this crystalline structure is a tetrahedron composed of one atom of silicon or aluminum surrounded by four oxygen atoms. The mordenite crystal is formed by chains of rings consisting of five of these tetrahedra. These chains form a lattice of large parallel canals, linked by small transverse canals. In synthetic mordenite the large parallel canals have a diameter of approximately 7 A. These canals are thus easily accessible to hydrocarbons. Naturally occurring mordenite contains irregularities in the crystal lattice along with impurities. For this reason the diameter of a large proportion of the parallel canals does not exceed 6 A, with the result that it is much more difficult for the hydrocarbons to be converted to penetrate into the natural mordenite.

It has now been found that a catalyst having high activity and good stability can be prepared by impregnating a catalyst support comprising a mixture of mordenite and amorphous silica-lumina with a solution of a fluorine compound, followed by drying the impregnated support and treating with a solution of one or more compounds of hydrogenative metals.

SUMMARY OF THE INVENTION

The invention is a catalyst and method of preparation thereof suitable for conversion of hydrocarbons. The catalyst is prepared by impregnating a catalyst support comprising hydrogen mordenite and an amorphous silica-alumina cracking catalyst with a solution of a fluoride compound followed by drying the impregnated support and treating with it a solution of one or more metals from Group IIA, IIIA, VIA, VIIA and VIII of the Periodic Table of Elements.

The catalyst support comprises a mixture of hydrogen-mordenite and silica-alumina cracking catalyst. Mordenite, customarily available in an alkali metal form, e.g. sodium form, is first converted to the hydrogen form before compositing with the amorphous silica-alumina. Conversion of mordenite to the hydrogen form, as is well known in the art, is effected by treating with an acid or an ammonium compound which is subsequently thermally decomposed to ammonia leaving the zeolite in the hydrogen form.

It has been found that a combination of these two treatments yields an excellent result. The treatment with the acid may precede that with the ammonium compound or vice versa.

Any acid, mineral or organic, may be used for the pretreatment. However, it is preferred to use a strong acid, the dissociation constant of which is higher than or equal to $2.0 \times 10^{15}$ at a temperature of 25° C. Examples of the preferred acids are the mineral acids such as $H_3PO_4$, $H_2SO_4$, $HNO_3$ and $HCl$, which have yielded the best results. If desired it is possible to use mixtures of acids.

These acids are conventionally used in a diluted form, preferably in an aqueous solution. The concentration of such aqueous solutions can be within very wide limits, although in general, preference is given to solutions of 0.1–5 N, especially those having a normality between 0.5 and 4, for example 2 N, which has yielded excellent results in practice.

In the process according to the present invention it is equally possible to use substances containing exchangeable hydrogen ions, such as carboxy polyesters and ion exchangers.

During the acid treatment the temperature and pressure may also vary within very wide limits. However, it is preferred to carry out this treatment at atmospheric or near atmospheric pressure, and at a temperature between 50° and 150° C, but preferably at the boiling point of the mixture containing the acid used in the treatment. Any ammonium compound, organic or mineral, may be used.

By ammonium compound is meant here any compound or mixture capable of forming ammonium ions.

The ammonium part of this compound is preferably $NH_4$, but may, if desired, be any other mono-, di-, tri- or tetraalkyl, aryl, alkenyl, arylalkyl or alkylaryl ammonium group, or a hydrazenium group. Nitrogen bases, for example pyridine, guanidine, quinoline, etc. may also be used.

The anionic part of the ammonium compound may be fluoride, chloride, bromide, iodide, sulfide, carbonate, bicarbonate, sulfate, phosphate, thiocyanate, dithiocarbamate, peroxysulfate, acetate, hydroxide, benzoate, carbamate, sesquicarbonate, citrate dithionate, gallate, nitrate, nitrite, formate, propionate, butyrate, valerate, lactate, malonate, oxalate, palmitate, tartrate, etc.

It is preferred to use neutral, i.e. non-acidic ammonium compounds. Particularly preferred are mineral compounds of ammonium especially such compounds as $NH_4OH$, $NH_4Cl$, $NH_4NO_3$, the ammonium sulfates, the ammonium phosphates, etc.

The treatment with an ammonium compound is preferably carried out with a solution of such compound.

Any solvent which forms ions can be used, however, aqueous solutions are preferred. If desired, mixtures of ammonium compounds can be used.

The concentration of the solution may vary within very wide limits, but preferably within the range of 0.1 to 12 N, such as those between 0.1 and 10 N. A 2 N solution, for example, gives excellent results.

The temperature of the treatment may vary between very wide limits. However, it is preferred to carry out this treatment at a temperature between 0° and 200° C, particularly at a temperature between 5° and 40° C, for example ambient temperature, at which excellent results have been obtained.

It may be useful to repeat the pretreatment with an acid or an ammonium compound once or several times, or even to repeat both of them.

It may also be equally desirable to dry the material after one of the pretreatments, preferably after both, for example at a temperature between 100° C and 250° C. If desired, it is also possible to follow or replace the drying operation by a calcination step; this often proves advantageous. Calcination may be carried out at any suitable temperature, but preferably at a temperature between 400° C and 700° C, especially at a temperature between 450° C and 500° C; excellent results are obtained at 500° C.

It has been found advantageous to repeat and/or to prolong the treatment with the ammonium compound until the treated material of the support evolves no more sodium or, at least, no more sodium discernible by analysis.

Although in principle, any sequence of the pretreatments will yield an improved catalyst, it is preferred to carry out the acid treatment before the treatment with the ammonium compound.

To obtain a catalyst support the hydrogen mordenite is mixed with a cracking catalyst. Preferred are cracking catalysts having a silica content higher than the alumina content, since these yield more active catalysts. Cracking catalysts having 50 to 90 percent w silica are preferred. Particularly preferred is a catalyst composed of 70–80 percent w of silica and 30–20 percent w of alumina.

In order to obtain stable catalysts it is preferred to use more cracking catalyst than mordenite in the carrier. Very suitable supports contain 5–50 percent w of mordenite and 95–50 percent w cracking catalyst. Supports containing 5–20 percent w of mordenite and 95–80 percent w of cracking catalyst yield particularly stable catalysts which are also sufficiently active.

The mordenite and the cracking catalyst may be mixed in the dry state. However, mixing in the presence of water permits a more intimate contact between the two components. The amount of water present during the mixing step should preferably be at least equal to the total pore volume of the mordenite plus cracking catalyst. Preferably the mixing step is carried out at a temperature between 20° C and 300° C with or without pressure, in a controlled atmosphere.

In one embodiment, the mordenite can be incorporated in the cracking catalyst during the preparation of the latter. In this method mordenite is added to a hydrogel of hydrated silica and alumina intimately mixed and subsequently dried. It is also possible to precipitate the hydrogel in the presence of mordenite and remove the excess water from the mixture.

To ensure that the final catalyst has a high level of cracking activity the catalyst support is impregnated with a solution of a fluorine compound.

A solution of hydrofluoric acid is very suitable for this purpose. Excellent results have been obtained using an aqueous solution of 1–10 percent w acid. An aqueous solution of ammonium difluoride, of which the fluoride ions concentration is equal to that of a solution of 1–10 percent w of hydrofluoric acid is also suitable. The impregnation should be carried out with a solution containing sufficient fluoride ions and for such time to incorporate 2–4 percent w fluoride on the catalyst support.

After the fluorine compound treatment, the catalyst support is dried, preferably at a temperature between 20° C and 200° C. Drying gives excellent adhesion of the fluorine to the catalyst support, thus promoting the formation of a particularly active and stable catalyst. The most favorable temperature for drying is between 110° C and 130° C, to obtain the best adhesion of the fluorine to the support.

The dried catalyst support containing fluorine is composited with one or more hydrogenative metals or metal compounds. This can be accomplished by treating the support with a solution of one or more compounds of one or more metals of Groups IIA (Zn, Cd, Hg), IIIA (Sc, Y, La and the lanthanides, AC and the actinides), VIA (Cr, Mo, W), VIIA (Mn, Tc, Re) and VIII (Fe, Co, Ni, Ru, Rh, Pd, Os, It, Pt) of the Periodic Table of Elements. It is preferred to prolong the treatment for such a time and to choose a solution of such a concentration that 1–5 percent w of one or more of these metals, based on the final catalyst, are deposited on the support.

The deposition of the metal or metals may be effected by impregnation or ion exchange. In the case of impregnation, the support is wetted with a solution of the desired metal compound, or incorporated in this solution; the solvent is then evaporated and the metal compound remains on the support. For ion exchange the support is contacted with a solution of the metal to be incorporated. This treatment results in replacement of the metal or hydrogen ions in the support by the ions of the desired metal. Consequently, the adhesion between the metal and the support is considerably strengthened, and catalyst activity and the stability of the final catalyst is enhanced. Thus, it is preferred to incorporate the metal in the support by ion exchange.

Ion exchange is suitably carried out at ambient temperature. In general, temperatures above 10° C are used to avoid too slow an exchange, while temperatures above 200° C have an adverse effect on the activity of the final catalyst. It is, therefore, advantageous to carry out the ion exchange at a temperature between about 10° and 200° C.

After the ion exchange it is preferred to wash the material in order to eliminate the remainder of the solution of the metal compound, which could lead to the formation of undesirable deposits of metal compound.

Nickel gives best results in the conversion of hydrocarbons and thus is the preferred metal in the catalyst. Nickel can be advantageously incorporated in the support by ion exchange. It is preferable to use an aqueous solution of nickel nitrate to which ammonium hydroxide has been added, although solutions of other nickel compounds, for instance a solution of nickel hexamine dichloride in water, are also very suitable for this purpose.

After incorporation of one or more of the said metals in the catalyst support, the catalyst is dried and calcined. Drying is preferably carried out a temperature between 100° C and 200° C, and more preferably between 110° C and 130° C. Calcination is preferably carried out between 550° C and 750° C. The calcination further strengthens adhesion between the hydrogenating metal and the fluorinated support, this favorably affecting the activity of the final catalyst.

The finished catalyst can be used as a powder as, for example, in a fluidized bed or slurried with hydrocarbons in the liquid state. For use in fixed bed reaction systems the catalyst can be compressed into tablets or extruded from a wetted slurry.

Extrusion may also be carried out with the wet catalyst support, before the latter is dried and calcined but after the metal has been incorporated by impregnation or ion exchange. In this case the extrudates are dried and thermally activated as described above.

Catalysts prepared according to the invention are particularly suitable for hydrogenative cracking of liquid hydrocarbons. The catalyst is especially suited for the production of propane and butane by cracking low-boiling feedstocks. Feedstocks having a final boiling point lower than 350° C are very suitable with particular preference given to feedstocks having a boiling point in the range of 50° C–200° C.

The reaction temperature in the hydrogenative cracking of liquid hydrocarbons to propane and butane according to the process of the present invention is preferably between 300° C and 500° C, more especially between 350° C and 450° C. The partial pressure of hydrogen is preferably between 20 and 200 atm., more especially between 30 and 100 atm. The liquid hourly space velocity between 0.1 and 10 liters of oil per hour paper kg. of catalyst is suitable and more especially between 0.5 and 2 liters of oil per hour per kg of catalyst. The hydrogen to oil molar ratio should be between 1:1 and 50:1, more especially between 5:1 and 20:1.

The process according to the invention will be further elucidated with reference to the following examples.

EXAMPLE I

A catalyst support was formed by mixing, in the presence of water, 90 percent w of a cracking catalyst composed of 75 percent w of silica and 25 percent w of alumina, with 10 percent w of synthetic mordenite in the hydrogen form. The support was impregnated with 3 percent w of fluorine from a solution of 2 percent w hydrofluoric acid. The support was then dried at 120° C and 52 g of the support were mixed with 1000 cc. of a 0.2 molar nickel nitrate solution, to which 3 gram molecules of ammonium hydroxide had been added. This mixture was stirred for 5 hours at approximately 20° C. During this period 3 percent w nickel, based on the final catalyst, were ion exchanged into the support. After filtration of the nickel nitrate and ammonium hydroxide solution the catalyst was washed with water to remove unbound ions. The catalyst was finished by drying at 120° C and calcining at 650° C. The latter treatment was continued for one hour.

This extruded catalyst (3×3 mm.) was used for hydrocracking a hydrofined Kuwait naphtha having a boiling range of 100°–150° C. Hydrocracking conditions were:

| | |
|---|---|
| Temperature | 500° C |
| Partial hydrogen pressure | 60 atm. |
| LHSV | 1.5 l/h/kg |
| Molar ratio hydrogen/oil | 10/1 |

Conversion to butane and lower boiling fractions was 86 percent w indicating high catalytic activity. The total quantity of methane and ethane produced was only 4.5 percent w. The molar ratio of propane to combined butanes in the final product was 1.06. Thus, the catalyst is selective for propane production, the favored product for domestic heating since it has a higher vapor tension at the same temperature and lower boiling point than butane.

Hydrocracking was continued for 800 hours without activity decline of the catalyst. The catalyst was thus perfectly stable.

EXAMPLE II

A support composed of a cracking catalyst containing 75 percent w silica and 25 percent w alumina, was impregnated to 3 percent w fluorine with an aqueous solution of hydrofluoric acid (2 percent w of HF). The support was dried at 120° C and composited with 3 percent w nickel, in the manner described in example I. The catalyst was subsequently dried at 120° C and calcined at 650° C and compressed to tablets (3×3 mm.). A naphtha similar to that in example I was cracked with the catalyst tablets under the same reaction conditions as those described in example I.

Conversion to butane and lower boiling hydrocarbons was only 52 percent w, while the molar ratio of propane to combined butanes did not exceed 0.38. Moreover, this catalyst was unstable; after 100 hours, conversion was only 44 percent w.

EXAMPLE III

A support consisting of synthetic mordenite in the hydrogen form, was supplied with 3 percent w fluorine and 3 percent w nickel as described in example I. The catalyst was subsequently dried at 120° C, calcined at 650° C and compressed to tablets of 3×3 mm.

A naphtha similar to that described in example I was hydrocracked over this catalyst under the same conditions as those described in example I.

This catalyst was very active, as demonstrated by the initial conversion of naphtha to butane and lower boiling hydrocarbons of 89.8 percent w. However, the catalyst was not stable; after 100 hours operation, the conversion had dropped to 60 percent w.

EXAMPLE IV

A catalyst support having the same composition as described in example I was formed in the same manner as described in that example. 3 percent w fluorine was applied to the support by impregnating with an aqueous solution of 2 percent w hydrofluoric acid. The support was subsequently dried at 120° C and impregnated with 3 percent w nickel with an aqueous solution of nickel nitrate. The catalyst was then dried at 120° C and calcined at 650° C. Tablets of the catalyst were used for naphtha cracking under the same operating conditions as described in example I. The conversion to butane and lower boiling hydrocarbons was 79.8 percent. The total quantity of methane and ethane produced was only 2.3 percent w. The molar ratio of propane to combined butanes was 0.73. The conversion remained constant throughout the test (800 hours) evidencing excellent catalyst stability.

EXAMPLE V

A similar catalyst support containing fluorine was formed in the same manner as described in example IV. However, instead of being dried, the wet catalyst was impregnated with an aqueous solution of nickel nitrate. The final catalyst, which contained 3 percent w fluorine and 3 percent w nickel, was finished by drying at 120° C and calcining at 650° C.

A similar naphtha was hydrocracked under the same conditions as described in example I, over the catalyst compressed to tablets (3×3 mm.).

This catalyst was very unstable. Conversion to butane and lower boiling hydrocarbons dropped from 87.0 percent w to 69.0 percent w after 100 hours of operation.

A comparison of the test results of examples IV and V reveals the importance of drying the catalyst support after incorporating fluorine.

We claim:

1. A catalyst suitable for hydroconversion of hydrocarbons comprising a catalyst support consisting of a mixture of hydrogen mordenite and amorphous silica and alumina, which support is impregnated with fluoride from a solution of a fluoride compound containing sufficient fluoride ions to incorporate 2–4 percent w fluoride on the catalyst support, dried and composited with a hydrogenative metal component selected from the group consisting of metals and compounds of metals from Group IIA, IIIA, VIA, VIIA and VIII of the Periodic Table of Elements and mixtures thereof.

2. The catalyst of claim 1 wherein the support comprises 5–50 percent w hydrogen mordenite.

3. The catalyst of claim 2 wherein the amorphous silica-alumina portion contains 70–80 percent w silica and 30–20 percent w alumina basis the amorphous silica-alumina portion.

4. The catalyst of claim 2 wherein the support is prepared by incorporating the hydrogen mordenite into a hydrogel of amorphous silica-alumina.

5. The catalyst of claim 2 wherein the amount of fluoride in the finished catalyst is from 2 to 4 percent w and the hydrogenation metal component is between about 1–5 percent w.

6. The catalyst of claim 5 wherein the hydrogenation metal is nickel.

7. A process for the preparation of the active and stable hydroconversion catalyst of claim 1 which comprises:
  a. preparation of a catalyst support consisting of hydrogen mordenite and amorphous alumina,
  b. impregnating the support with fluoride from a solution of a fluoride compound containing sufficient fluoride ions to incorporate 2–4 percent w fluoride on the catalyst support,
  c. drying the impregnated support,
  d. incorporating into the fluorided support a hydrogenative metal selected from the group consisting of metals and compounds of metals from Group IIA, IIIA, VIA, VIIA and VIII of the Periodic Table of Elements and mixtures thereof, and
  e. drying and calcining the composite.

8. The process of claim 7 wherein the support contains 5–20 percent w mordenite and the amorphous silica-alumina contains 70–80 percent w silica and 30–20 percent w alumina.

9. The process of claim 7 wherein the support is impregnated with 2–4 percent wt fluoride and 1 to 5 percent wt hydrogenative metal.

10. The process of claim 7 wherein the hydrogenative metal is incorporated by ion exchange.

11. The process of claim 8 wherein the mordenite and amorphous silica-alumina are mixed in the presence of water.

12. The process of claim 8 wherein the mordenite is incorporated into a hydrogel of amorphous silica-alumina.

13. The process of claim 9 wherein fluoride is impregnated from a 1 to 10 percent wt hydrofluoric acid solution.

14. The process of claim 9 wherein the hydrogenation metal is nickel.

15. A process for the hydrogenative cracking of liquid hydrocarbons by contact at elevated temperature and pressure with a catalyst prepared according to the process of claim 7.

16. The process of claim 15 wherein the hydrocarbon feed has a boiling point below about 350° C.

* * * * *